No. 788,973. Patented May 2, 1905.

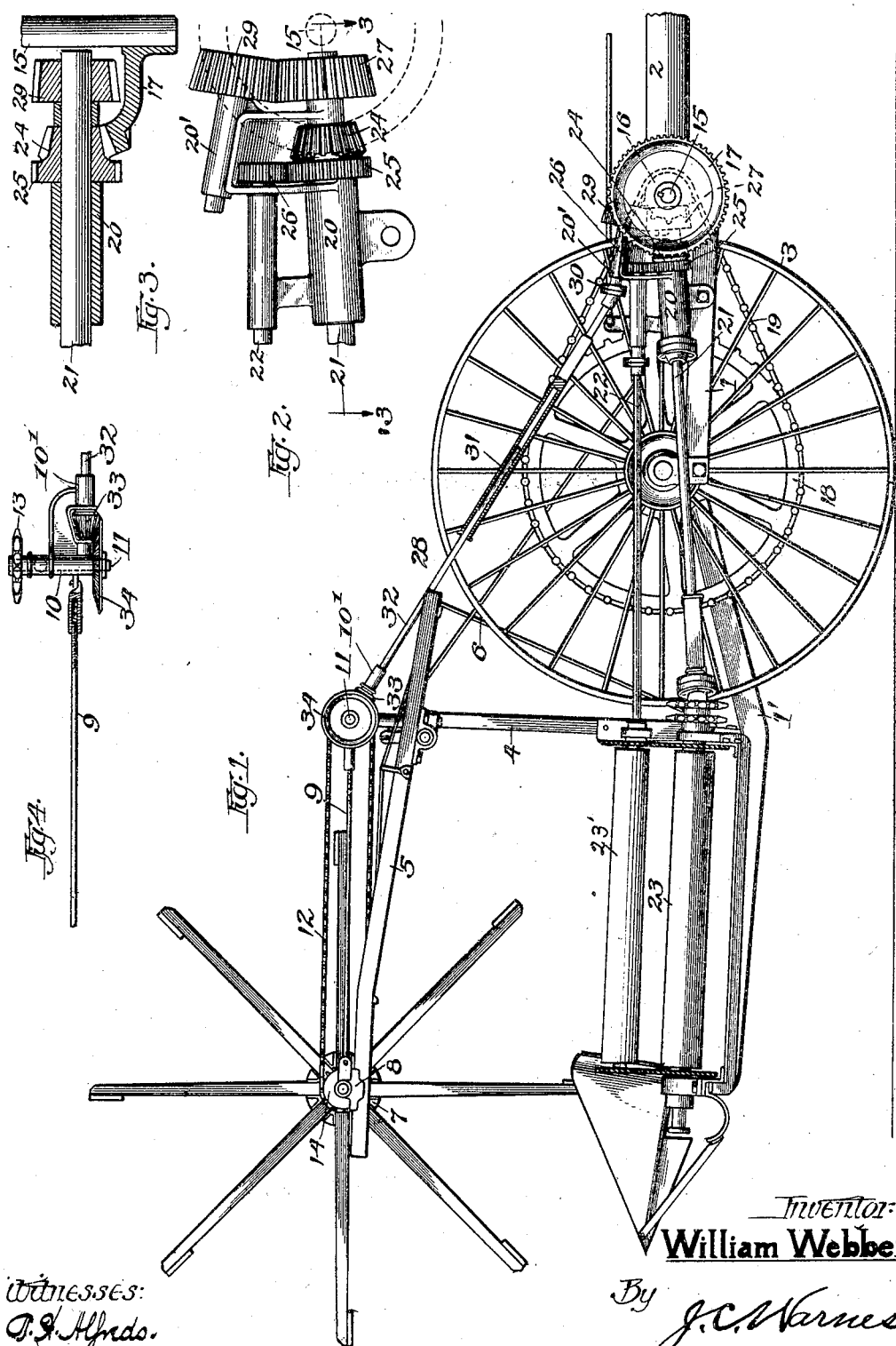

UNITED STATES PATENT OFFICE.

WILLIAM WEBBER, OF CHICAGO, ILLINOIS.

REEL-DRIVE FOR HARVESTERS.

SPECIFICATION forming part of Letters Patent No. 788,973, dated May 2, 1905.

Application filed December 31, 1904. Serial No. 239,107.

*To all whom it may concern:*

Be it known that I, WILLIAM WEBBER, a citizen of the United States, residing at Chicago, in the county of Cook and State of Illinois, have invented a new and useful Improvement in Reel-Drives for Harvesters, of which the following is a complete specification.

This invention relates to harvesters of the header type, and more especially to the means employed for imparting movement to the reel.

The object of the invention is to provide a simple and a practically direct gear connection between the cross-shaft of the harvester and the counter-shaft on the reel-supporting frame.

Referring to the drawings, Figure 1 represents a stubble-side elevation of the principal parts of a harvester of the header type, in which is embodied my invention. Fig. 2 is an enlarged stubble-side elevation of the driving-gears located adjacent to the outer end of the cross-shaft or driving-shaft of the machine, the large bevel-gear on the end of this shaft being shown in light dotted lines in order to not obstruct the view of the other parts. Fig. 3 represents a sectional view taken as indicated by the line 3 3 in Fig. 2; and Fig. 4 is a plan view of the reel counter-shaft, illustrating the gear connection of the reel driving-shaft therewith.

In the drawings, 1 designates the main frame of the header; 1', the platform-frame; 2, a portion of the push-pole, and 3 the stubble-side supporting and driving wheel.

4 represents one of the vertical posts of the reel-frame, 5 one of the pivotally-mounted horizontally-extending members thereof, and 6 a brace-rod connecting the rearwardly-extending end of the horizontal member with the foot of said post. On the horizontally-extending member 5 is slidably mounted the reel 7, the bearing 8 thereof being held rigidly in place by means of the adjustable rod 9, the rear end of which engages the bearing 10 of the reel counter-shaft 11. A sprocket-chain 12 engages the sprocket-wheel 13 on said counter-shaft 11 and the sprocket-wheel 14 on the shaft of the reel 7, through which motion is communicated to said reel.

In suitable bearings (not shown) on the main frame of the harvester is journaled the driving or cross shaft 15, to which is rigidly secured the sprocket-wheel 16, and on the outer end of said shaft is secured the large bevel-gear 17. Secured to the main wheel 3 and concentric therewith is the driving sprocket-wheel 18, the chain 19 connecting it with the sprocket-wheel 16 on the cross-shaft 15. In the bracket 20, which is secured to the main frame 1 forward of the outer end of the cross-shaft 15, journal the elevator driving-shafts 21 and 22, which drive, respectively, the platform-roller 23 and the elevator-roller 23'. Near the rear end of the shaft 21 is secured the bevel-pinion 24, which meshes with and is driven by the bevel-gear 17. Immediately forward of the said bevel-pinion 24 and preferably integral therewith is secured the pinion 25, which meshes with the pinion 26 on the shaft 22 and imparts movement thereto. The bevel-pinion 24 is received on the shaft 21 between the journal-bearings of the bracket 20, as shown, and on the rearwardly-projecting end of the said shaft is secured the bevel-pinion 27.

Arranged at the upper side of the bracket 20 and preferably integral therewith is the boss 20', in which journals the rear and lower end of the reel-shaft, which is designated as a unit by the numeral 28. On the lower end of this reel-shaft is secured the bevel-pinion 29, which meshes with and is driven by the bevel-pinion 27, thus communicating motion to the reel-shaft. By having the pinion 27 secured to the extension of the shaft 21 the need of a secondary shaft with proper gear connection is avoided and a very compact and durable arrangement effected.

The reel-shaft 28 is provided with a universal coupling 30 near the bearing 20', which will permit said shaft to accommodate itself to the various positions it assumes incident to the adjustment of the platform-frame 1' relative to the main frame. To render the reel-shaft extensible, the lower portion thereof is fitted with a square sleeve 31, in which is placed the square shaft 32, the upper end of which journals in the bracket extension 10' of the bearing 10. A bevel-pinion 33, secured to the upper end of the square shaft 32, meshes with and drives the counter-shaft 11 through the bevel-gear 34. The extensible reel-driving shaft 28, in connection with the coupling 30, will permit any degree of adjustment of the platform-frame 1' or of the reel 7.

What I claim as my invention, and desire to secure by Letters Patent, is—

1. In a harvester, in combination, a cross-shaft, a bevel-gear secured to the outer end thereof, platform and elevator driving shafts, suitable bearings therefor and a gear connection therebetween, two additional pinions secured to one of said shafts, one of which meshes with and is driven by the said bevel-gear, and a reel-driving shaft having a pinion on the lower end thereof which meshes with and is driven by the other one of said pinions, substantially as described.

2. In a harvester, in combination, a cross-shaft, a bevel-gear secured to the outer end thereof, platform and elevator driving shafts, a bracket which affords journal-bearing for the rear ends of said shafts and gears connecting said shafts, two additional pinions secured to the lower shaft, the forward one of which meshes with and is driven by the said bevel-gear, and an extensible reel-driving shaft, the lower end thereof journaling in said bracket and having a pinion on the lower end thereof which meshes with and is driven by the other one of said pinions, substantially as described.

WILLIAM WEBBER.

Witnesses:
J. C. WARNES,
T. N. DAGGETT.